US011575459B2

(12) United States Patent
Fan et al.

(10) Patent No.: US 11,575,459 B2
(45) Date of Patent: Feb. 7, 2023

(54) SECURE COMMUNICATIONS THROUGH DISTRIBUTED PHASE ALIGNMENT

(71) Applicant: Rutgers, The State University of New Jersey, New Brunswick, NJ (US)

(72) Inventors: Xiaoran Fan, New Brunswick, NJ (US); Yanyong Zhang, New Brunswick, NJ (US); Wade K. Trappe, New Brunswick, NJ (US); Richard E. Howard, New Brunswick, NJ (US)

(73) Assignee: RUTGERS, THE STATE UNIVERSITY OF NEW JERSEY

( * ) Notice: Subject to any disclaimer, the term of this patent is extended or adjusted under 35 U.S.C. 154(b) by 0 days.

(21) Appl. No.: 17/045,368

(22) PCT Filed: Apr. 5, 2019

(86) PCT No.: PCT/US2019/025969
§ 371 (c)(1),
(2) Date: Oct. 5, 2020

(87) PCT Pub. No.: WO2019/195666
PCT Pub. Date: Oct. 10, 2019

(65) Prior Publication Data
US 2021/0167887 A1 Jun. 3, 2021

Related U.S. Application Data

(60) Provisional application No. 62/653,089, filed on Apr. 5, 2018.

(51) Int. Cl.
*H04K 1/00* (2006.01)
*H04B 17/12* (2015.01)
*H04B 17/318* (2015.01)

(52) U.S. Cl.
CPC ............ *H04K 1/006* (2013.01); *H04B 17/12* (2015.01); *H04B 17/318* (2015.01)

(58) Field of Classification Search
CPC ...................................................... H04K 1/006
See application file for complete search history.

(56) References Cited

U.S. PATENT DOCUMENTS

| | | | |
|---|---|---|---|
| 2001/0033579 A1* | 10/2001 | Nelson, Jr. | H04L 12/5602 370/447 |
| 2004/0042390 A1* | 3/2004 | Celebi | H04B 7/0682 370/210 |
| 2005/0101352 A1 | 5/2005 | Logothetis | |
| 2007/0140389 A1 | 6/2007 | Lindenmeier et al. | |
| 2007/0191074 A1 | 8/2007 | Harrist et al. | |
| 2008/0309452 A1 | 12/2008 | Zeine | |
| 2013/0193773 A1* | 8/2013 | Van Wageningen | H02J 7/00034 307/104 |
| 2014/0035379 A1* | 2/2014 | Stevens | H02J 50/12 307/104 |
| 2014/0125138 A1 | 5/2014 | Herbst | |

(Continued)

OTHER PUBLICATIONS

International Search Report and Written Opinion for PCT/US2019/025969, dated Sep. 4, 2019.

*Primary Examiner* — Hsinchun Liao
(74) *Attorney, Agent, or Firm* — Meagher Emanuel Laks Goldberg & Liao, LLP (57) ABSTRACT

Various embodiments comprise systems, methods, architectures, mechanisms or apparatus for wireless secret communication with a device.

17 Claims, 7 Drawing Sheets

(56) References Cited

U.S. PATENT DOCUMENTS

| | | |
|---|---|---|
| 2014/0184446 A1 | 7/2014 | Park et al. |
| 2015/0256226 A1 | 9/2015 | Lin et al. |
| 2015/0333797 A1* | 11/2015 | Nejatali ................ H04L 7/0332 375/376 |
| 2017/0256994 A1 | 9/2017 | Joyce |
| 2017/0346347 A1 | 11/2017 | Abiri et al. |
| 2018/0166906 A1* | 6/2018 | Malhotra ............... A45C 15/00 |

* cited by examiner

IN RESPONSE TO RECEIVING A CHARGING REQUEST FROM A TARGET DEVICE, SELECT A SUBSET OF AVAILABLE WAVE TRANSMITTERS TO TRANSMIT RESPECTIVE WAVES TOWARD THE TARGET DEVICE
310

INDIVIDUALLY CALIBRATE EACH SELECTED WAVE TRANSMITTER BY:
- CAUSING THE WAVE TRANSMITTER UNDER CALIBRATION TO TRANSMIT ITS RESPECTIVE WAVE AT EACH OF A PLURALITY OF PHASE OFFSETS
- DETERMINE AN INDICATED RECEIVED POWER AT THE TARGET RECEIVER FOR TRANSMITTED WAVE AT EACH OF THE PLURALITY OF PHASE OFFSETS
- SELECT FOR USE BY THE WAVE TRANSMITTER UNDER CALIBRATION THE PHASE OFFSET RESULTING IN THE LARGEST INDICATED RECEIVED POWER AT THE TARGET RECEIVER
- IF PHASE OFFSETS RESULTING IN THE LARGEST AND SMALLEST INDICATED RECEIVED POWERS AT THE TARGET RECEIVER ARE WITHIN A THRESHOLD AMOUNT THEN DESELECT WAVE TRANSMITTER

320

IF INDICATION OF INSUFFICIENT RECEIVED POWER AT THE TARGET RECEIVER:
- CALIBRATE SELECTED WAVE TRANSMITTERS AND/OR
- SELECT AND CALIBRATE ADDITIONAL WAVE TRANSMITTERS FOR TARGET DEVICE UNTIL INDICATION OF SUFFICIENT RECEIVED POWER AT THE TARGET RECEIVER.

SECURE COMMUNICATIONS THROUGH DISTRIBUTED PHASE ALIGNMENT

CROSS-REFERENCE TO RELATED APPLICATION

This application claims priority to U.S. Provisional Patent Application No. 62/653,089 filed on Apr. 5, 2018 entitled SAFE WIRELESS POWER TRANSFER AND SECURE COMMUNICATIONS THROUGH DISTRIBUTED PHASE ALIGNMENT, which application is incorporated herein by reference in its entirety.

FIELD OF THE DISCLOSURE

The present disclosure generally relates to wireless power transfer and communications.

BACKGROUND

Safe wireless power transfer technologies are desirable for numerous reasons and long-sought by industry. Unfortunately, various attempts have thus far been disappointing in terms of safety and/or efficacy.

SUMMARY

Various deficiencies in the prior art are addressed by systems, methods, architectures, mechanisms or apparatus for wireless secret communication with a device.

One embodiment provides a secure communications system comprising a plurality of wave transmitters located about an area and configured for transmitting respective waves toward a target device or receiver within the area; and a controller, configured for communicating with the target device to receive therefrom a signal indicative of received power at the target device, and communicating with the wave transmitters to cause at least a portion of the plurality of wave transmitters to transmit respective waves in accordance with respective phase offsets selected in response to the signal indicative of received power at the target device; wherein each of the waves transmitted toward the target device includes a common message modulated thereon in accordance with a common encoding scheme. The waves transmitted toward the target device may be phase perturbed in accordance with a common phase perturbation scheme.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Surround-Charge Embodiments

Various embodiments provide a wireless power transfer (WPT) system in a manner avoiding the problems associated with traditional beamforming systems (i.e., overheating issues along the beam path) or magnetic resonant systems (i.e., high energy everywhere in within the field). The disclosed WPT system utilizes multiple transmitters disposed about (i.e., surrounding) a target device (target receiver) for transmitting respective beams toward the target device, wherein a collaborative alignment or coherent combining of the beam phases at the target device provides precisely focused energy just at the target device, thereby enabling omnidirectional wireless power transfer to the target device.

Specifically, a high energy density location or region is formed at a focal point location (i.e., the location of the target device) while low energy density exists at other locations. Using a number of transmitters, the WPT can achieve a peak to average energy density ratio of 100:1 or more. The WPT may be implemented using electromagnetic waves (e.g., radio frequency, optical frequency etc.) as well as mechanical waves (e.g., ultrasonic waves).

In one embodiment, a wireless power transfer system is deployed within a conference room, building or other volume of three-dimensional space to generate therein a high energy density spot or region using waves transmitted from a number of locations surrounding the three dimensional space or at least surrounding the target device. A target device located at the high energy density location or region may thereby receive sufficient power to perform a charging function and/or (as will be discussed more detail below) received communications in an extremely secure manner.

Generally speaking, a number of wave transmitting antennas are located such that some or all of the antennas define therebetween a three dimensional space within which the various embodiments discussed herein are operable to provide energy to a target device via respective paths. In various embodiments, the wave transmitting antennas are located in a substantially co-planar manner (e.g., at multiple locations on a ceiling or floor or wall) such that waves propagated from the transmitting antennas follow different paths to the target device.

Figure 1:
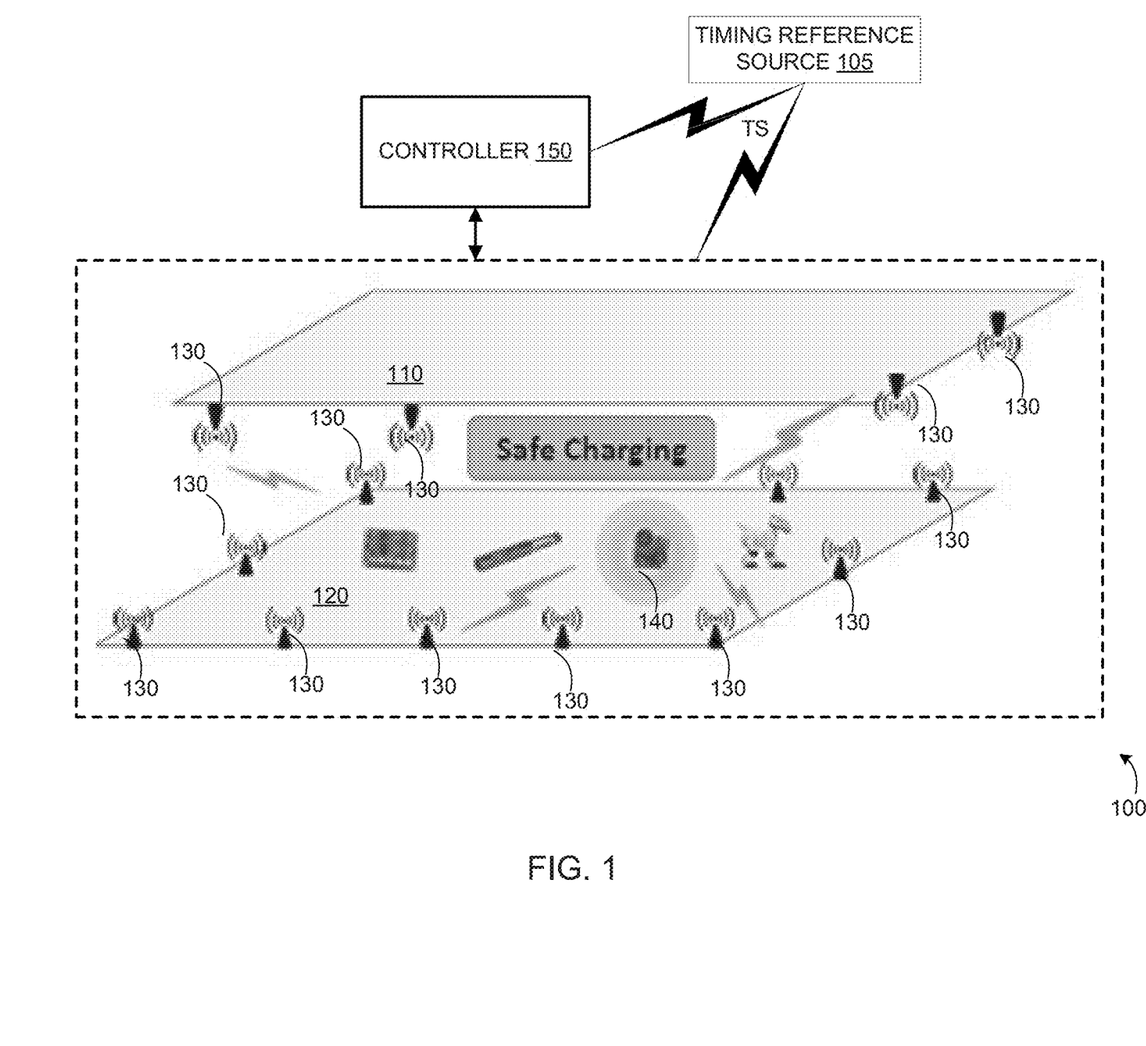
FIG. 1 depicts an embodiment of a wireless charging system according to an embodiment.

FIG. 1 depicts an embodiment of a wireless charging system according to an embodiment. Specifically, FIG. 1 depicts a room having a floor 110, a ceiling 120 and various walls (not shown) wherein a plurality of transmitters 130 deployed at various peripheral locations around the room are configured to transmit respective electromagnetic signals/waves to one or more receivers 140 within the room.

The transmitters are showed as being deployed at, illustratively, the ceiling corners, floor corners and various other locations where the walls meet the floor and/or ceiling. Other configurations are contemplated by the inventors, such as an array of wave transmitting antennas on the ceiling or a wall.

For purposes of this discussion it will be assumed that each of the transmitters 130 comprises an electromagnetic wave transmitting antenna such as radiofrequency (RF) transmitting antenna and associated transmitting, phase adaptation and control circuitry. In particular, transmitting antennas is driven by a respective RF transmitter capable of adjusting the phase of the corresponding transmitted electromagnetic wave in response to a control signal such that a plurality of phase aligned electromagnetic waves may be provided at the location of target device 140 within the room.

In various embodiments, a controller 150 communicates with at least some of the transmitters 130 to control various transmission parameters such as, illustratively, the frequency, amplitude, phase and the like associated a wave transmitted toward the receiver 140.

In various embodiments, a timing signal TS received from a timing source 105 is used by the controller 150 and/or one or more of the transmitters 130 to more accurately program and/or modify the transmitted electromagnetic signals/waves. For example, in various embodiments each of the transmitters 130 phase locks its respective transmitted wave to a clock synchronized with the timing source and, thereby, synchronized with the other transmitters 130. In this manner, the phase of one or more of the plurality of transmitted waves may be precisely adaptation such that a phase alignment of the plurality of transmitted waves at the receiver is achieved.

Various embodiments contemplate that each of the various electromagnetic waves transmitted toward the target device will impart at least a minimum amount of power to the target device, where the minimum amount of power is less than an amount of power considered to be harmful to humans or otherwise undesirable, and where the phase alignment of the received electromagnetic waves provides an amount of power sufficient to support a battery charging function, Internet of Things (IoT) activation function or some other target device function.

In various embodiments, each beam transmitting antenna is associated with its own transmitter. In various embodiments, each of a plurality of physically proximate beam transmitting antennas is associated with a single transmitter (e.g., transmitters along one wall, or in a particular corner, or on a ceiling or floor etc.). In various embodiments, substantially all of the plurality of beam transmitting antennas defining a three dimensional space are associated with a single transmitter.

In various embodiments, a grid or mesh of beam transmitting antennas is deployed where various subsets of the available transmitters are used to define respective three-dimensional spaces. Specifically, a first subset or portion of a plurality of available transmitting antennas is initially selected to provide charging energy to a receiving device such as a cell phone, laptop, tablet, sensor, relay or other device to be charged, energize a sensor or other device, energize/trigger a communications device or enable/perform some another operation at the receiving device. Based upon a feedback signal provided from the receiving device that is indicative of power received at the device, the initially selected transmitting antennas are calibrated to ensure that the transmitting antennas provides waves that are substantially phase locked or additive at the device such that sufficient energy is delivered thereto for charging or operation of the device.

More or fewer transmitting antennas may be used for charging/operating a receiving device to ensure that the power received at the receiving device reaches and maintains at least a minimum threshold power level, or a power level between minimum and maximum threshold power levels. Further, different transmitting antennas may be used such as for a receiving device that is moving proximate a grid of transmitting antennas. Further, the transmitting antennas selected to provide energy to a receiving device may change depending on various conditions. For example, as individual transmitting antennas become less able to supply energy to a receiver (e.g., distance to moving receiver, intervening obstacles, reflected signals and the like), those transmitting antennas are deselected from the set of transmitting antennas used to supply energy to the receiver.

In various embodiments, the distance between chargers (i.e., transmitting antennas) is comparable with the distance between chargers and the target. The distributed transmitters or transmitting antennas align their phases at the target device, making the received signal constructively add up to a received signal more powerful than any of the individually transmitted signals. That is, an energy ball or region is formed around the target; the energy is focused on the target while leaving the energy density everywhere else low.

In free space, the received signal's magnitude R(t) and power P are as follows:

$$R(t) = e^{jwt} \sum_{i}^{N} a_i / d_i e^{j(\beta_i + \phi_i)}$$

$$P = \left| \sum_{i}^{N} a_i / d_i e^{j(\beta_i + \phi_i)} \right|^2$$

Where $a_i$ is the amplitude of the i-th charger, $d_i$ is the distance between this charger and the receiver. The initial phase, which is random and unknown to the system, is denoted as:

$$\beta_i = w(d_i/c) + \phi_i$$

The steering phase, which is controllable, is denoted as:

$$\phi_i$$

Received power P is maximized when all chargers are properly phase aligned $$\beta_1 + \phi_1 = \ldots = \beta_i + \phi_i = \ldots = \beta_n + \phi_n$$

To phase align the charging waves provided by the chargers/transmitters, each charger's steering phase is adjusted to reach a phase alignment with that of the other chargers/transmitters. This phase alignment may be provided via synchronized processes and non-synchronized techniques.

One non-synchronized technique comprises chargers/transmitters randomly adjusting their phases around their current base phase value. For each new combination, the receiver gives feedback on whether the combination yields higher received power that the base value does. If yes, chargers/transmitters update their base phase value and adjust again based upon the new base value. Repeating this process, phases will be gradually aligned and the received power will reach its maximum. The advantage of this method is that receiver and transmitters don't need to be synchronized, though phase alignment/convergence speed may not be sufficient for mobile charging applications.

With chargers/transmitters and receiver synchronized together, one-shot phase alignment can be achieved using channel reciprocity wherein the chargers/transmitters and the receiver work in, e.g., a time division duplex (TDD) mode to allow substantially simultaneous phase alignment/convergence.

Advantageously, the various embodiments avoid overheating and enable energy transfer even when objects are blocking a direct path between wave transmitter and wave receiver by enabling a precise focus on a particular receiver location. The amount of energy transmitted by any one antenna is selected to be less than an amount of energy able to cause overheating or damage to objects.

Figure 7:
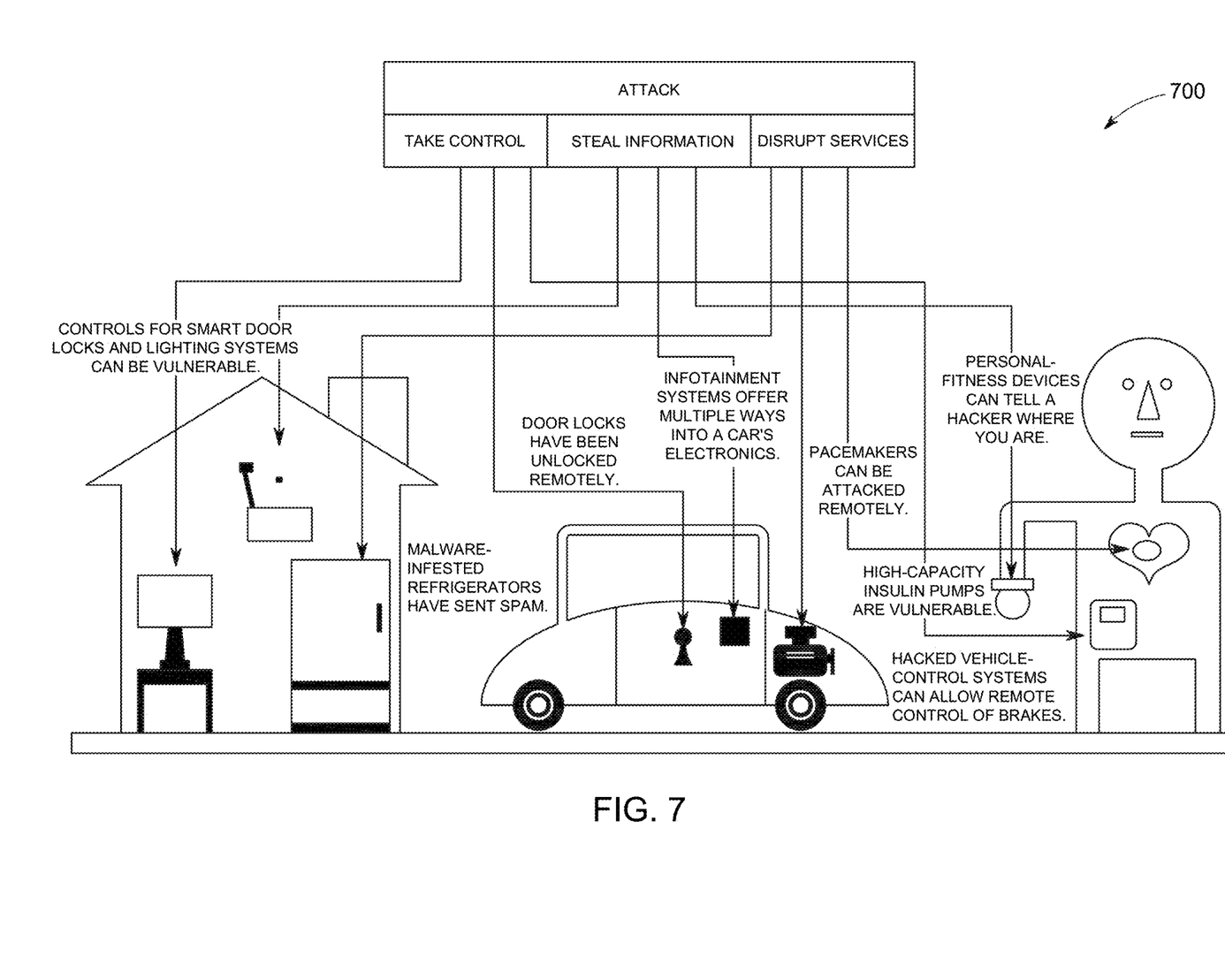
FIG. 7 depicts and Internet of Things (IoT) use case benefiting from various embodiments.

In one embodiment, a test system was deployed, comprising 16 USRP N210 (1 transmitter on each N210) and 4 USRP B210 (2 transmitters on each N210) as chargers that are mounted on a 3 m high ceiling, at four corners of a 20×20 m2 area (shown in FIG. 7(a)(b)). The system further included WBX RF daughter boards on the N210s, and working frequencies of 915 and 964 MHz. Synchronization of the transmitter clocks through a roof-mount GPS receiver was provided, and tests showed chargers/transmitters transmitting 20 dBm energy isotropically. Further testing with blockages of some of the chargers/transmitters had minimal influence on optimal charging power being delivered to the receiver since the various chargers/transmitters were continually adjusting their phases from the receiver's feedback information.

Figure 2:
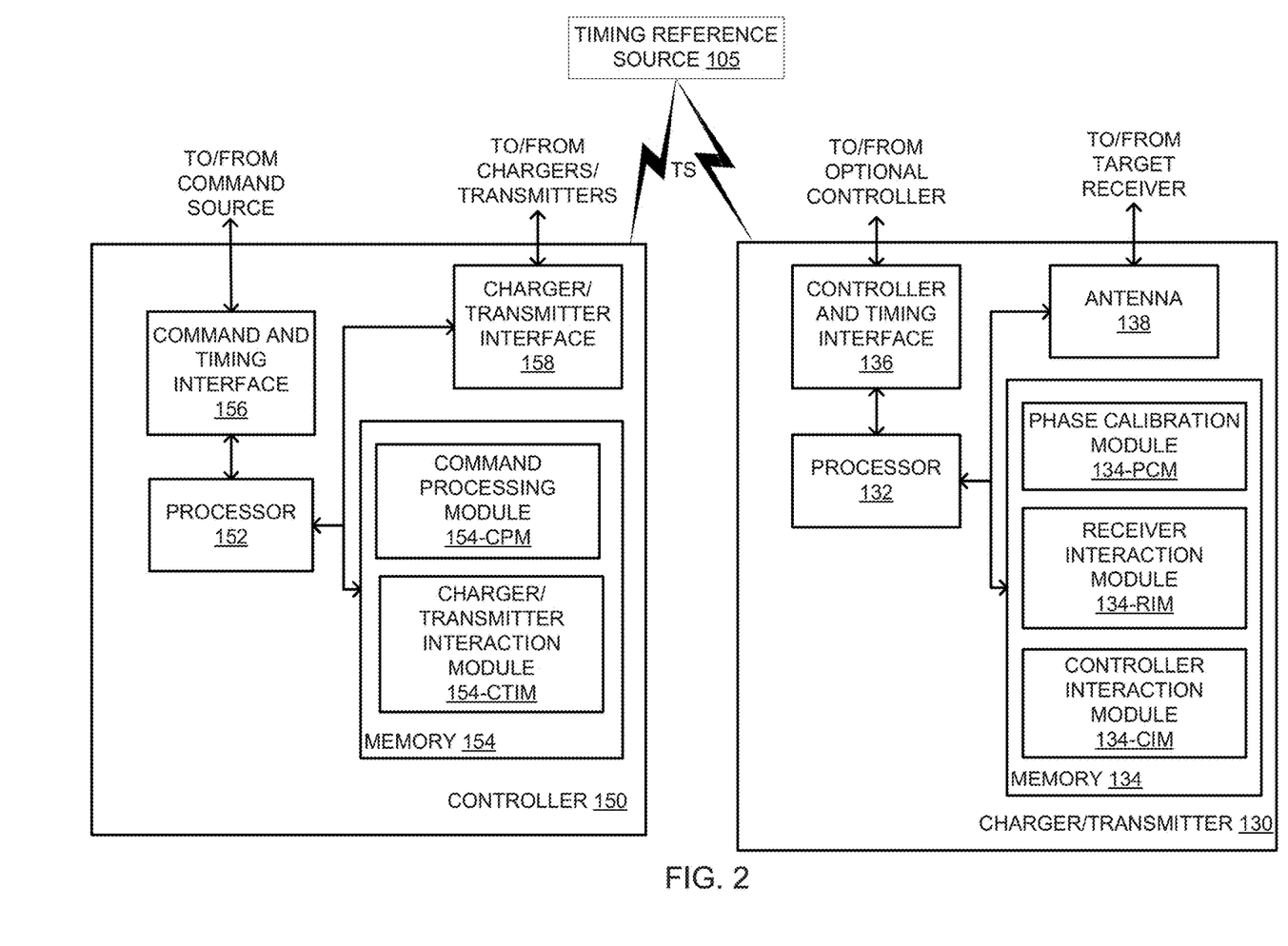
FIG. 2 depicts a high-level block diagrams of and exemplary controller and an exemplary charger/transmitter suitable for use within the system of FIG. 1.

FIG. 2 depicts a high-level block diagrams of and exemplary controller 150 and an exemplary charger/transmitter 130 suitable for use within the system of FIG. 1.

A simplified implementation of a controller 150 is depicted as including as including one or more processor(s) 152, a memory 154, a command and timing interface 156 and a charger/transmitter interface 158. The processor(s) 152 is coupled to, and adapted to cooperate with, the memory 154, the command and timing interface 156, the charger/transmitter interface 158 and various another support circuitry (not shown) to provide the various functions as described herein with respect to the controller 150.

The command and timing interface 156 is depicted as facilitating communications with an optional command source (not shown), such as a remote management or communications system. The communication channel supporting such communications may comprise any type of network or communications channel, such as Internet protocol (IP) network, a 3G/4G LTE wireless network and the like. The command and timing interface 156 is also depicted as receiving a timing signal TS from a timing reference source 105, such as global positioning system (GPS) satellites, mobile network base stations and/or other timing sources.

The charger/transmitter interface 158 is depicted as facilitating communications with one or more chargers/transmitters 130 such as depicted above with respect to FIG. 1. The communication channel supporting such communications may comprise a wireless or wired communication channel, depending upon range/proximity of the controller 150 and chargers/transmitters 130, security concerns (e.g., such as discussed below with respect to secret communication embodiments), noise/interference concerns and other application-specific parameters.

The memory 154, generally speaking, stores programs, data, tools and the like that are adapted for use in providing various functions as described herein with respect to the figures. For example, the memory 154 is depicted as storing instructions associated with a command processing module 154-CPM and a charger/transmitter interaction module 154-CTIM, which instructions cause the respective modules to perform the various functions as described herein.

A simplified implementation of a charger/transmitter 130 is depicted as including as including one or more processor(s) 132, a memory 134, a controller and timing interface 136 and an antenna 138. The processor(s) 132 is coupled to, and adapted to cooperate with, the memory 134, the controller and timing interface 136, the antenna 138 and various another support circuitry (not shown) to provide the various functions as described herein with respect to the charger/transmitter 130.

The controller and timing interface 136 is depicted as facilitating communications with an optional controller 150 such as depicted above with respect to FIG. 1. The communication channel supporting such communications may comprise a wireless or wired communication channel, depending upon range/proximity of the controller 150 and chargers/transmitters 130, security concerns (e.g., such as discussed below with respect to secret communication embodiments), noise/interference concerns and other application-specific parameters. The controller and timing interface 136 is also depicted as receiving a timing signal TS from a timing reference source 105, such as global positioning system (GPS) satellites, mobile network base stations and/or other timing sources.

The memory 134, generally speaking, stores programs, data, tools and the like that are adapted for use in providing various functions as described herein with respect to the figures. For example, the memory 134 is depicted as storing instructions associated with a phase calibration module 134-PCM, receiver interaction module 134-RIM and controller interaction module 134-CIM, which instructions cause the respective modules to perform the various functions as described herein.

Figure 3:
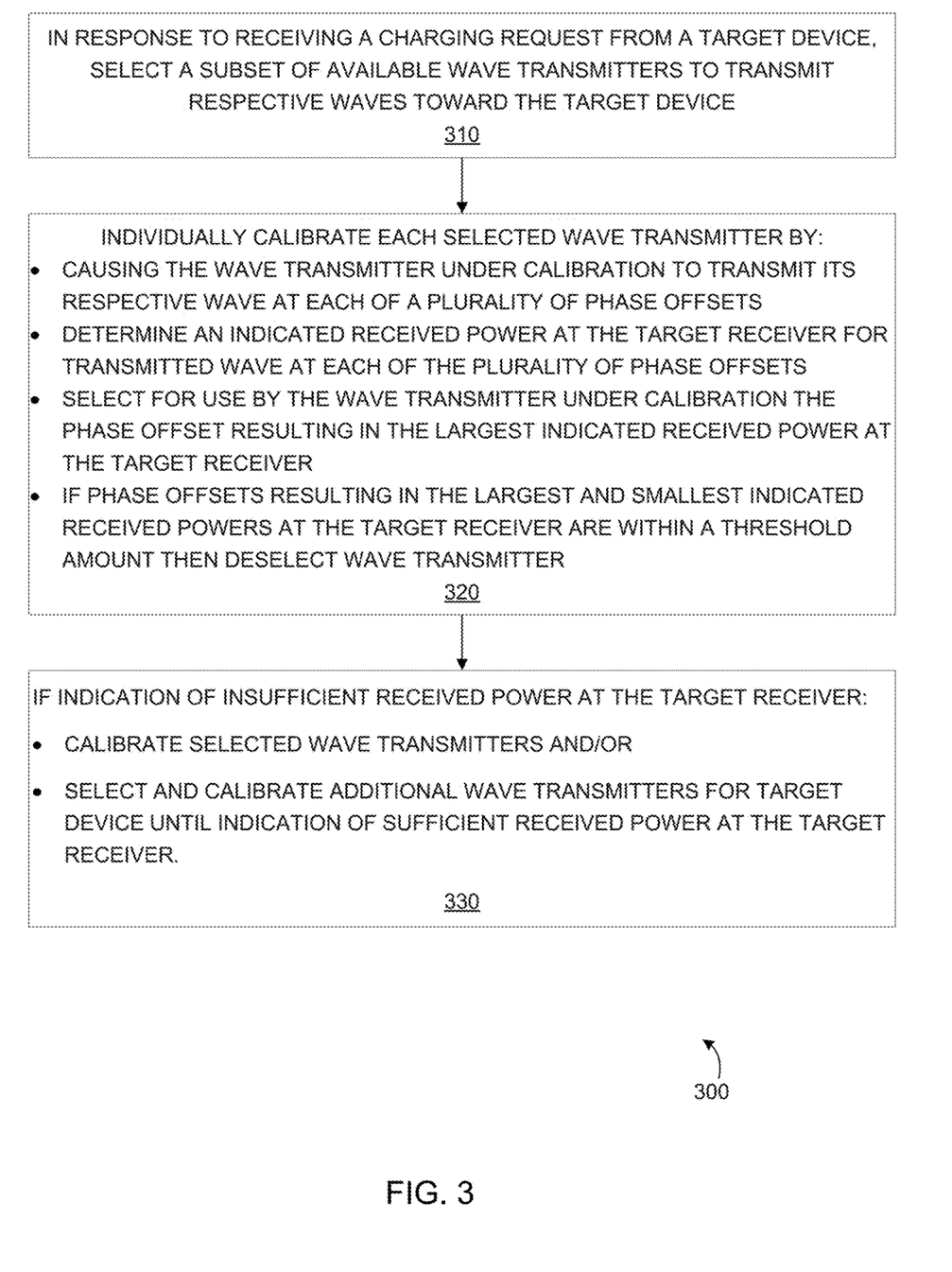
FIG. 3 depicts a flow diagram of a wireless charging method according to one embodiment.

FIG. 3 depicts a flow diagram of a wireless charging method according to one embodiment. In particular, FIG. 3 depicts a method 300 suitable for use in the system 100 of FIG. 1 to provide wireless charging to a target device 140 within the context of a room comprising a plurality of chargers/transmitters 130. The method 300 contemplates that a controller 150 or one of the chargers/transmitters 130 operates as a controlling device with respect to a plurality of chargers/transmitters 130 available for use in providing electromagnetic or other charging waves to a target device.

At step 310, in response to receiving a charging request from a target device (receiver), a subset of the available chargers/transmitters 130 is selected to transmit respective waves toward the target device. For example, given a plurality of chargers/transmitters 130 in excess of that which is necessary to provide useful signal at a target device, an initial subset of the available chargers/transmitters 130 is selected for further processing in accordance with the method 300.

At step 320, each selected charger/transmitter 130 is calibrated by performing, for each individual charger/transmitter 130, the steps of (1) causing the charger/transmitter under calibration to transmit its respective wave at each of a plurality of phase offsets; (2) determining an indicated received power at the target device for the transmitted wave at each of the plurality of phase offsets; (3) selecting for use by the charger/transmitter under calibration the particular phase offset resulting in the largest indicated received power at the target device; and (4) optionally deselecting the charger/transmitter under calibration if the phase offset resulting in the largest and smallest indicated received power at the target device is within a threshold amount (i.e., the charger/transmitter under calibration has little to no effect at the target device).

As previously noted, the calibration step may be performed by randomly selecting phase offsets for each of the chargers/transmitters selected for use in charging the target device until such time as a combination of selective phase offsets results in a maximum indicated received power at the target device. In other embodiments, the calibration step may be performed on an individual basis wherein each charger/transmitter under calibration is processed to provide at the target device a maximum amount of indicated received power.

A maximum amount of received power is provided to the target device when the waves transmitted to the target device are phase aligned at the target device, as discussed herein. As such, in some embodiments a first charger/transmitter need not be calibrated since subsequent chargers/transmitters may be calibrated to provide at the target device respective phase-aligned waves.

The indicated received power at the target device is determine via a power-indicative signal received from the target device, as discussed herein. As such, individual chargers/transmitters may be calibrated within respective timing. Such that a correlation may be made between an increase or decrease in power and the particular charger/transmitter under calibration.

In the case of a charger/transmitter having little or no effect at the receiving device due to being too far away from the receiving device or having an obstructed path to the receiving device, such charger/transmitter is of little value and may be deselected such that it may be used to provide signal to another receiving device if needed.

At step 330, in response to an indication of insufficient received power at the target device, one or both of the following functions are performed: (1) calibrate each of the selected chargers/transmitters and/or (2) select and calibrate additional chargers/transmitters for transmitting respective waves toward the target device until an indication of sufficient received power at the target device is received. That is, if the presently selected chargers/transmitters when properly calibrated do not provide sufficient power to charge a battery, energize a sensor, trigger a communications device or perform some other task, then some of these charger/transmitters may be out of calibration (i.e., providing ways not phase-aligned at the receiving device), some of the charger/transmitters may have become ineffective due to distance from the target device or wave path blockage or some other effect, or there is simply an insufficient number of chargers/transmitters selected for use in providing ways to the target device to achieve an intended purpose.

The above-described method 300 contemplates a dynamic wireless charging system in which target devices request wireless charging via, illustratively, the controller 150 or a charger/transmitter 130. In response a sufficient number of chargers/transmitters 130 are selected to provide electromagnetic, ultrasonic or other ways as appropriate to the target device, which waves are phase-aligned by calibrating the chargers/transmitters 130 as described herein. Further, the above-described method 300 contemplates that multiple target devices may be charged at the same time via different subsets of a plurality of available chargers/transmitters. It is noted that given an overlap of transmitted energy within a defined space, one or more receivers may be able to impart useful energy to multiple target devices. In one embodiment of the invention, a standard or even relatively stronger charger/transmitter 130 is provided at a centralized location in a room and used as a first or base source of energy for each of a plurality of target devices.

In various embodiments the target device is stationary and once an appropriate amount of power is delivered via an appropriate number of chargers/transmitters the number of subsequent changes in charger/transmitter election and/or calibration will be minimal. However, in various embodiments where the target device 140 is moving (e.g., within a room or building) such that in addition to changing phases of different transmitted waves due to such motion, certain chargers/transmitters may become less effective due to their distance to the target device increasing too much, whereas other chargers/transmitters may become more effective due to their distance to the target device being reduced.

The above-described surround-charge embodiments are directed toward providing a plurality of electromagnetic, ultrasonic or other energy-bearing waves to a receiving device wherein such waves are phase-aligned at the receiving device to thereby add up to a useful amount of power delivered to the receiving device. In these embodiments, the useful amount of power is that amount sufficient to charge a battery, energize a sensor or perform some other task.

Secret-Focus Communications Embodiments

Various communications embodiments are related to, and/or expand upon, wireless charging and power transfer embodiments such as discussed above. In particular, secret-focus communications embodiments will now be described wherein a set of distributed chargers/transmitters provide data-bearing waves to a receiving device, wherein such waves are phase-aligned at the receiving device to provide thereby sufficient power of data-bearing waves such that the receiving device can demodulate, decode and otherwise extract data therefrom.

In some embodiments, the amount of power provided to the receiving device may be sufficient to charge or energize the receiving device as discussed above. In some embodiments it is contemplated that the receiving device does not require wireless charging such that the waves transmitted to the receiving device may comprise extremely low energy waves where phase alignment of these wave at the receiving device is necessary to enable the receiving device to extract data therefrom.

By configuring the system to require appropriate phase alignment of the data-bearing waves at a target receiving device to receive communications, an eavesdropping device, even if very close to the target receiving device, will necessarily be at a physical location not benefiting from the appropriate phase alignment of the data-bearing waves and, therefore, will be unable to retrieve the data provided thereby. wherein phase alignment of the waves at the receiving device is necessary for retrieving the data provided thereby. A simplified prototype system constructed by the inventors utilized 16 distributed transmitters using USRP N210s in a 20×20×3 m3 area (i.e., four transmitters in each corner of a room). When sending more than 160M bits over the system to the receiver, depending on system parameter settings, measurements indicated that eavesdroppers would fail to decode 30% to 60% of the transmitted bits across multiple locations while the intended receiver has an estimated bit error ratio of 3×10-6.

In some embodiments, a dithering of phase alignment of the various chargers/transmitters is utilized to further thwart eavesdropping devices proximate the receiving device.

Referring to FIG. 1, assume that secret bit strings are intended to be transmitted in a coordinated manner to the receiving device 140 via a collection of transmitting devices 130. This is achieved by first reaching a steady state wherein the waves transmitted by the transmitting devices 130 are phase aligned at the receiving device 140 (denoted herein as $\Phi_{align}$), and then communicating the secret bit strings to the receiving device 140. Any of a number of phase alignment techniques may be used for this process as discussed herein.

Specifically, each transmitter 130 adjusts the phase of its communication signal and, with the help of a small amount of feedback from the target device but without assuming any knowledge about any eavesdropping device, the collection of transmitters achieve significantly improved signal quality at the target receiving device as compared to the signal quality at any unintended or eavesdropping receiver.

Figure 4A:
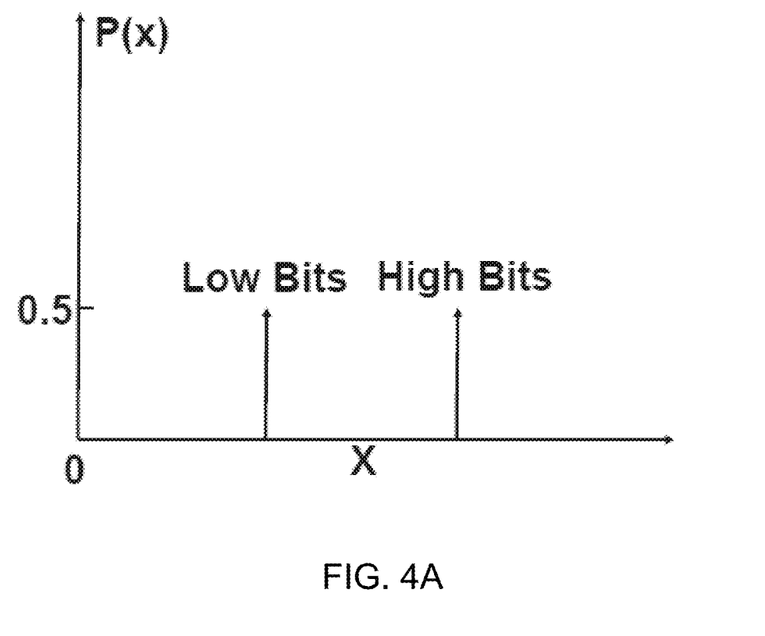
FIGS. 4A-4B graphically depict modulated data parameters useful in understanding the embodiments.

In accordance with one embodiment, all transmitters 130 know the secret message to transmit toward the target device 140. Using a commonly-agreed transmission scheme (e.g., a basic pulse amplitude modulation scheme as depicted herein, a QAM scheme or other modulation scheme), each transmitter transmits a suitably phase-aligned high signal to transmit a 1 bit, and a phase-aligned low signal to convey a 0 bit as depicted in FIG. 4(a). These phase-aligned transmissions constructively add at the target receiving device to produce a received signal Y, while a number of non-phase-aligned signals will constructively add to become a different signal Z at an eavesdropping device. Further, with each transmitter slightly dithering phases after alignment, each mode of Y will have a mean corresponding to how well the phase alignment combines constructively at the target receiving device, and a variance from noise. Hence, signal values Y can be modeled as a mixed (complex) Gaussian function with two modes, where one mode corresponds to the 1 bit and the other corresponds to 0 bit (as depicted in FIG. 4B), and similarly for Z.

A secrecy rate may be calculated as I(X;Y)–I(X;Z), which captures the achievable rate at which secure communications to the target receiving device in the presence of eavesdropping devices, with the high/low discrete signaling.

Figure 4B:
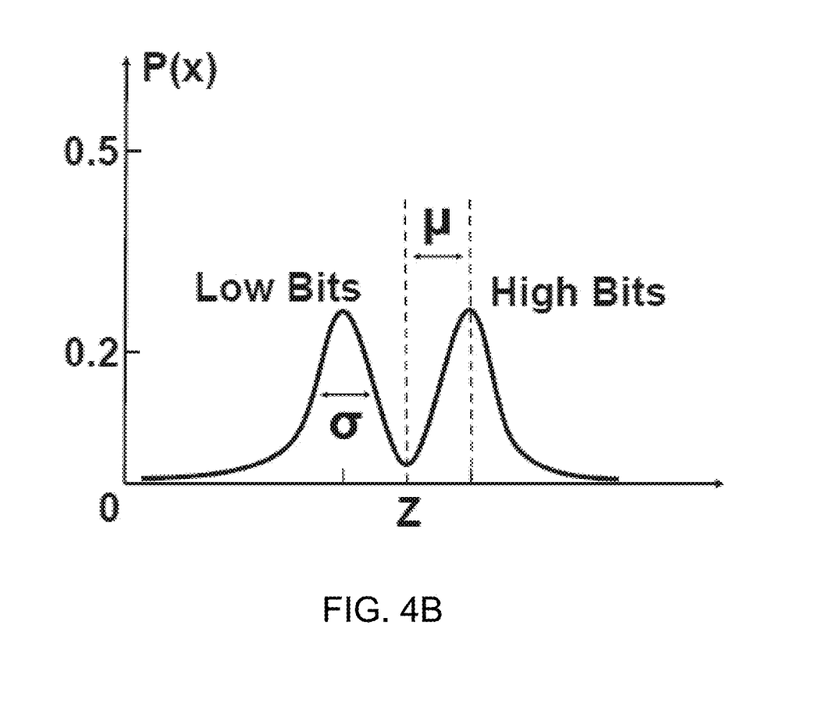

Using I(X;Y)=H(Y)–H(Y|X), and the differential entropy H(Y) for a mixed Gaussian function, intermediate terms may be defined such as the ratio of the means to variances, as the secret communication ratio (SCR) for each recipient (target device or eavesdropping device), which is defined herein as the average signal value divided by the standard deviation, as follows and is indicated in FIG. 4B:

$$\alpha = \frac{\mu}{\sigma}$$

It is further noted $\frac{1}{2}\ln(2\pi e \sigma_y^2)$, I(X; Y) becomes I(X; Y)=$\alpha_y^2$–$I_y$, where: that H(Y|X) collapses to:

$$I_y = \frac{2}{\sqrt{2\pi}\alpha_y} e^{-\alpha_y^2/2} \int_0^\infty e^{-x^2/2\alpha_y^2} \cosh(x)\ln(\cosh(x))dx$$

Thus, the secrecy rate for a choice of X is:

$$(I(X;Y)-I(X;Z))^+ = (\alpha_y^2 - \alpha_z^2 + I_z - I_y)^+$$

As applied within the context of the various embodiments, in order to differentiate communications between a source and each of the target device and an eavesdropping device a positive and higher secrecy rate is desirable for the communication between the source device and the target device versus any communication between the source device and the eavesdropping device. That is, the objective is to achieve a higher signal-to-noise ratio and lower signal variation at the target receiving device and a lower signal-to-noise ratio and higher signal variation at the eavesdropping device, as follows:

$$\alpha_y > \alpha_z$$

The various embodiments achieve this objective through two complementary mechanisms; namely, (1) significantly improving the average signal value at the target receiving device using multiple transmitters focusing their efforts, and (2) relatively increasing the standard deviation of the signal at eavesdropping devices by intentionally introducing additional phase perturbations following initial phase alignment, which additional phase perturbations have minimal effect at the target receiving device while having tremendously negative effect at any eavesdropping devices.

The objective of improving the average signal value at the target receiving device is met by using multiple transmitters focusing their efforts such that a plurality of phase-aligned waves coherently combined at the target device to provide a data-bearing communications signal having a relatively high average signal value. By ensuring the phase-aligned waves associated with the secret communication signal are coherently combined at the location of the target receiving device, the same data-bearing communications signal will not be coherently combined at the location of an eavesdropping receiving device and, as such, the eavesdropping receiving device having tremendously increased bit error rate for whatever portion of the data-bearing communications signal it receives.

The objective of increasing the standard deviation of the signal at eavesdropping devices is met by intentionally introducing additional phase perturbations following an initial phase alignment at the target device. Specifically, once phase alignment is achieved, the actual phase offsets of the various transmitters are perturbed around the alignment phase. In doing so, the signal values measured by the eavesdropping device fluctuate significantly, thereby hindering the eavesdroppers ability to decode the received signals. This perturbation does not harm the signal decoding ability at the target receiving device.

Having distributed transmitters align their phases and then employing a slight dithering (around the proper alignment phase $\Phi_{align}$) achieves a positive secrecy rate as it leads to higher and more stable RSS values at the intended receiver, but lower and less stable RSS values at other locations. These properties are utilized within the context of the various embodiments to facilitate secret communication through amplitude-based modulation schemes, such as on off key (OOK) communication, pulse amplitude modulation (PAM), or quadrature amplitude modulation (QAM).

Figure 5:
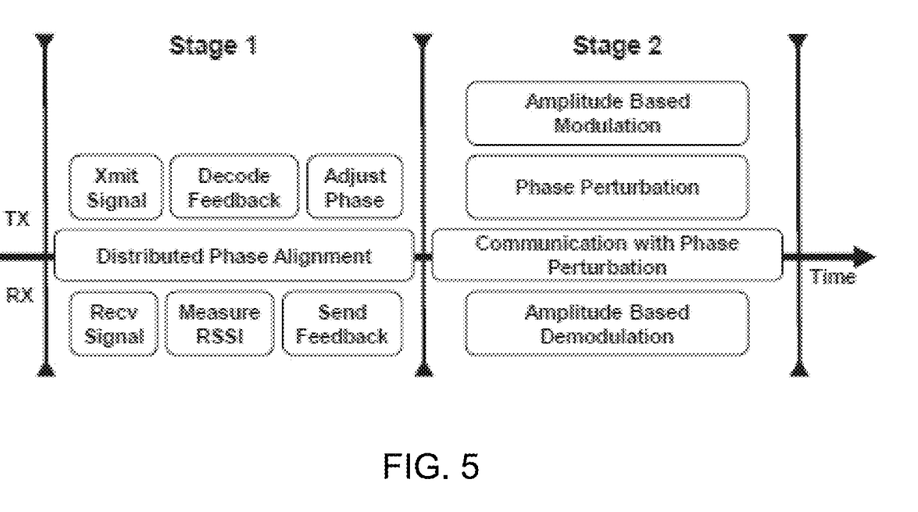
FIG. 5 graphically depicts transmitter and target device operations useful in understanding the embodiments.

FIG. 5 graphically depicts transmitter and target device operations of each of a phase alignment stage and the communication with phase perturbation stage of a secret communication system in accordance with various embodiments.

The first or distributed phase alignment stage as depicted in FIG. 5 contemplates that each of a plurality of transmitters is operable to transmits a number of signals with differing phase offsets to a target device, which receives each of the signals, measures the corresponding received signal strength (RSS) and sends to the appropriate transmitter a feedback signal indicative of the corresponding RSS of each received signals. Each transmitter decodes the various feedback signals and adjusts it's transmission signal phase accordingly such that over a relatively short period of time various transmitters achieve phase alignment $\Phi_{align}$ as further described herein.

The second or communication with phase perturbation stage as depicted in FIG. 5 contemplates secret data to be sent to the target receiving device is modulated (e.g., amplitude-based modulation) and transmitted by each of the transmitters, wherein the transmitted signal is subjected to phase perturbation further described herein, and wherein the target device demodulates (e.g., amplitude-based demodulation) the phase perturbed modulated data signal provided via the multiple transmitters to extract therefrom the secret data.

Phase alignment may be accomplished as described above with respect to FIGS. 1-3. For example, a simple trial-and-our approach may be provided in which all transmitters and receivers share the same clock (e.g., GPS or mobile network derived clock), which clock is partitioned into segments of equal duration. Within each of a plurality of phase alignment rounds, every transmitter sends a signal to the receiver at a randomly adjusted phase, where the phase is randomly picked to be within +/−$\Phi$ degrees of the previous phase value. At the end of each round, the receiver sends a small feedback message to indicate whether the new phase combination gives higher energy than the previous phase combination. If so, then each transmitter hold this new phase value. If not, then each transmitter returns to its previous phase value. The phase adjustment is defined as follows:

$$\theta_i(n+1) = \begin{cases} \theta_i(n) + \delta_i(n), & \text{if } Y[n] > \max_{k<n} Y[k], \\ \theta_i(n), & \text{otherwise.} \end{cases}$$

where $\theta_z(n)$ denotes transmitter i's phase in round n, and

Other approaches may be used to achieve phase alignment $\Phi_{align}$ as previously discussed. Further, various techniques may be utilized to implement target device signaling of received signal power and other information. For example, in various embodiments, a width-based modulation scheme is used to encode/decode power-indicative or signal-indicative feedback at the target device for transmission toward transmitters such as for use in achieving appropriate phase alignment. As an example, a fixed feedback rate of 25 Hz was used, which feedback rate was selected since it is also the transmitter phase adjustment rate of the experiment.

In an explicit signaling embodiments, when the transmitter wave phases are properly aligned at $\Phi_{align}$, the target receiving device broadcasts a pre-defined constant signal of, illustratively, 964 MHz to tell the transmitters to start data communication. This explicit signaling ensures that transmitters and receivers enter the communication stage at the same time. In the communication stage, the transmitters focus on two tasks: amplitude based modulation and frequent phase perturbation.

In an exemplary embodiment using one-bit pulse amplitude modulation (PAM) to provide simplicity of discussion, each symbol's amplitude is modulated as:

$$\overline{A} = [a_L, a_H]$$

In this embodiment, the amplitude of high bits and low bits, $a_L$ and $a_H$, are important system parameters which may be modified in accordance with desired system operation. These and other important system parameters will be discussed more detail below.

Phase perturbation in the communication phase ensures the RSS values at any non-target location have much greater variation than those at the target location, while ensuring transmitter phases are still aligned at the target location. Specifically, each transmitter perturbs its phase around $\Phi_{align}$ at a predefined rate (illustratively 100 Hz, though this may be increased or decreased in various embodiments) which defines thereby a sequence of perturbation intervals. At each perturbation interval, the transmitter randomly pick a value within ±Ø and add that value to $\Phi_{align}$. The particular values of Ø selected, as well as the perturbation rate are important system parameters which may be modified in accordance with desired system operation and will be discussed in more detail below. For example, faster perturbation can thwart more capable eavesdroppers.

At the communication stage, the target receiving device operates to measure the received RSS and decode each bit accordingly. It is assumed that the target receiving device as well as any potential eavesdroppers know the symbol duration $t_{sb}$. Various embodiments contemplate that a window based demodulation scheme wherein after receiving a header, for each incoming payload bit the RSS during the symbol. Of the payload bit is measured and compared to the average RSS as determined within a pre-set window duration. If the current bit RSS is higher than the recent window average, then the bit is decoded as a 1; otherwise, it is decoded as a 0.

In an exemplary system built and tested by the inventors, a plurality of transmitters (illustratively 16) were disposed as equal-sized groups at each of four corners of a room. The transmitters were set to transmit 1200 bits to the target receiving device, with 80 consecutive low bits as a header, and the rest as the payload (consisting of randomly generated ones and zeros) such that $a_L$=0.8 and $a_H$=1. For each transmitted bit, the RSS at the target receiving device was measured, normalized to a value between 0 and 1, and placed in corresponding RSS bins to calculate thereby a histogram. The experimental results showed that while the target receiving device correctly decoded a bit, the decoding bit error ratio (BER) or ratio between the number of incorrect bits and the total bits transmitted for an eavesdropper device was 42:1%, which is close to a completely random system with BER of 50%. At the same time, Bob correctly decodes the bits. Hence, communication between transmitters and Bob is kept secret. For purposes of the experiment it was assumed that symbol duration, header length, and communication start time was known to both the target receiving device and an eavesdropper device.

Various important system parameters may be adjusted to improve different aspects of operation of the various embodiments. Larger values of low bits amplitude in amplitude modulation $a_L$ leads to higher BER for eavesdroppers. Keeping the maximum perturbation angle Ø between 15° and 20° provides an appropriate amount of perturbation change; if Ø is too large, than the target receiving device RSS values may become less stable, whereas if Ø is too small, then eavesdropper RSS values may not be sufficiently disturbed. Increasing the number of transmitters N yields a higher BER for eavesdroppers, and in various experiments four transmitters has been deemed to be sufficient to provide secret communications as discussed herein. Experimental data suggest that choosing different symbol duration values $t_{sb}$ has only a minor impact on eavesdropper BER.

Figure 6:
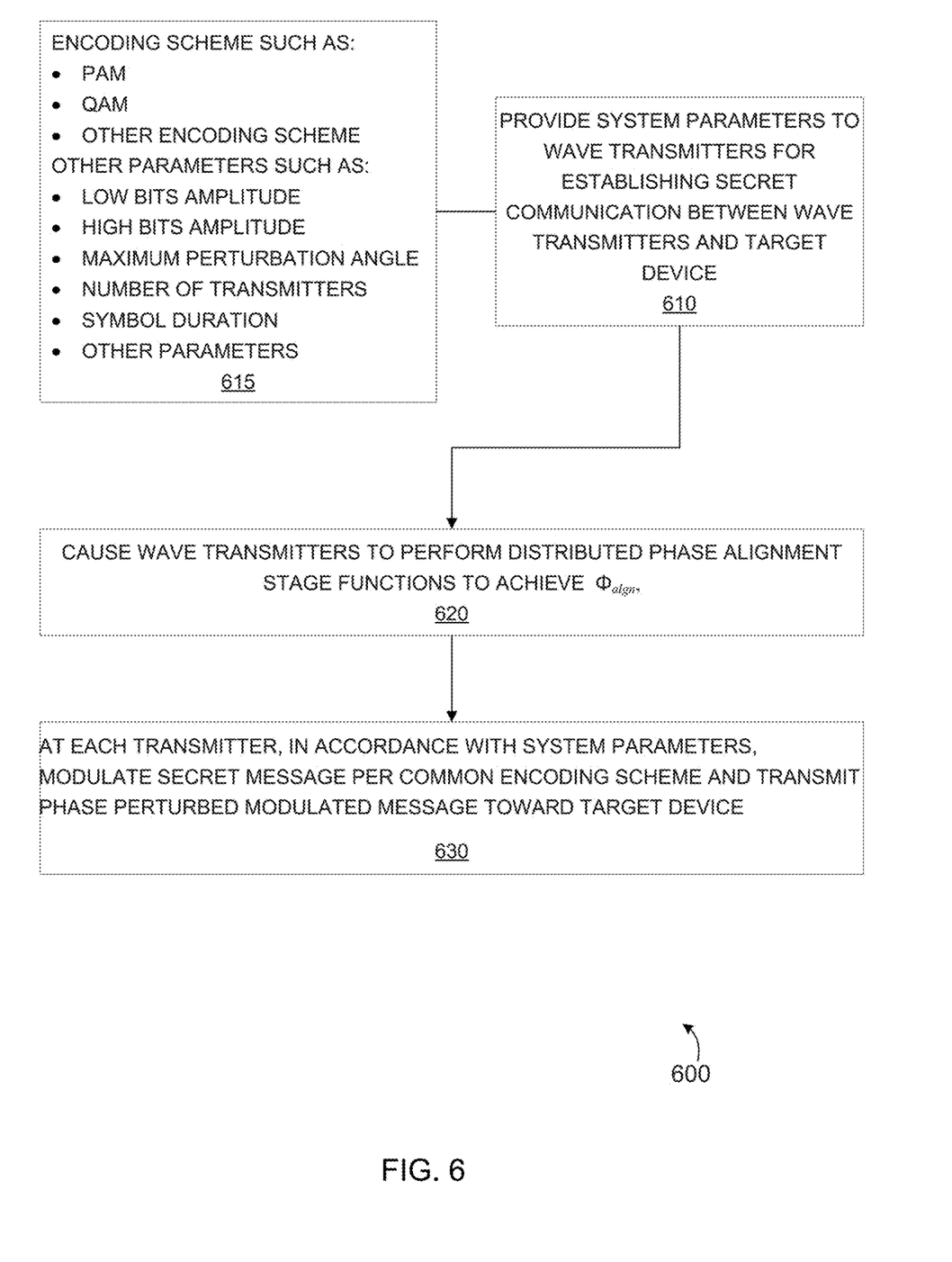
FIG. 6 depicts a flow diagram of a method for providing secret communications according to an embodiment.

FIG. 6 depicts a flow diagram of a method for providing secret communications according to an embodiment. In particular, FIG. 6 depicts a flow diagram of a method for providing secret communications such as discussed above with respect to the various figures.

At step 210, system parameters are provided to wave transmitters for establishing secret communication between the wave transmitters and a target device. The system parameters may comprise default parameters already programmed into the wave transmitters, or system parameters provided by a controller or other entity. Referring to box 615, system parameters may comprise a choice of encoding scheme, such as pulse amplitude modulation (PAM), quadrature amplitude modulation (QAM), other encoding schemes as well as specific parameters such as low bits amplitude, high bits amplitude, maximum perturbation angle, number of transmitters (if variable/selectable) symbol duration as well as other parameters.

At step 620, the wave transmitters are caused to perform the distributed phase alignment functions to achieve phase alignment $\Phi_{algn}$ at the target receiving device.

At step 630, each transmitter, in accordance with the provided system parameters, modulates a common secret message per a common encoding scheme and transmits a modulated message toward the target receiving device while protecting the phase of the transmitted signal.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

FIG. 7 depicts and Internet of Things (IoT) use case benefiting from various embodiments.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

For example, the below Appendix includes several papers relevant to the embodiments discussed herein and such embodiments as well as portions thereof may be modified in accordance with the teachings of the papers provided below in the Appendix. Further, the various embodiments contemplate wireless charging mechanisms, secure wireless communications mechanisms and variations/combinations thereof. It is noted that variations to the wireless charging mechanisms as described herein and in the relevant portion(s) of the below Appendix may be applied to the secure wireless communications mechanisms as described herein, and that variations to the secure wireless communications mechanisms as described herein and in the relevant portion(s) of the below Appendix may be applied to the wireless charging mechanisms as described herein.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A secret communication system, comprising:
   a plurality of radio frequency (RF) transmitters located about an area, each RF transmitter configured for transmitting a respective data-bearing RF signal within the area, each data-bearing RF signal being substantially similar and including common data therein; and
   a controller, configured for communicating with a target device within the area to receive therefrom a signal indicative of a total received RF power at the target device associated with received data-bearing RF signals, and for communicating with said plurality of RF transmitters to cause at least two of said plurality of RF transmitters to transmit in accordance with respective phase offsets selected in response to said signal indicative of total received RF power such that the total received RF power at the target device associated with the received RF signals provides an amount of energy sufficient to enable the target device to extract the common data therein.

2. The secret communication system of claim 1, wherein:
said controller, in response to receiving a request from a target device, selecting said at least two of said plurality of RF transmitters to transmit respective data-bearing RF signals toward said target device; and
said controller individually calibrating each selected RF transmitter, said calibration comprising causing a RF transmitter under calibration to transmit its respective data-bearing RF signal at each of a plurality of phase offsets, determining an indicated received power at the target device for each of the plurality of phase offsets, and selecting for use by the RF transmitter under calibration the phase offset resulting in a largest indicated received power at the target device.

3. The secret communication system of claim 2, wherein said controller, in response to an initial calibration of said selected at least two RF transmitters resulting in an indication of insufficient received power at the target device, selecting and calibrating individual additional RF transmitters to transmit respective data-bearing RF signals having the common data modulated thereon toward said target device until said signal indicative of received power at the target device associated with the respective data-bearing RF signals is indicative of sufficient received power at the target device.

4. The secret communication system of claim 3, wherein said controller, in response to an indication of insufficient received power at the target device, individually calibrating each of said selected RF transmitters until an indication of sufficient received power at the target device.

5. The secret communication system of claim 2, wherein said calibration further comprises:
determining a difference in power between the phase offset associated with the largest indicated received power at the target device and the phase offset associated with the smallest indicated received power at the target device; and
in response to said difference in power being less than a threshold amount of power, removing the RF transmitter under calibration from the selected group of RF transmitters.

6. The secret communication system of claim 5, wherein said RF transmitters comprise optical transmitters.

7. The secret communication system of claim 1, wherein said RF transmitters comprise optical transmitters.

8. The secret communication system of claim 1, wherein said indication of sufficient received power at the target device is provided via a width-based modulated signal generated at said target device.

9. The secret communication system of claim 1, wherein each of said RF signals transmitted toward said target device includes common data modulated thereon in accordance with a common encoding scheme.

10. The secret communication system of claim 9, wherein each of said RF signals transmitted toward said target device is phase perturbed in accordance with a common phase perturbation scheme.

11. The secret communication system of claim 9, wherein said a plurality of RF transmitters are disposed as four RF transmitter groups at respective corners of a room.

12. The secret communication system of claim 1, wherein each of the data-bearing RF signals having modulated thereon the common data is formed in accordance with a common transmission scheme and configured to constructively combine proximate the target device to provide the common data therein thereto.

13. The secret communication system of claim 12, wherein said controller is further configured to cause phase-dithering of phase-aligned data-bearing RF signals produced by at least a subset of the RF transmitters to selectively perturb, as a group, the data-bearing RF signals produced by the subset of RF transmitters.

14. The secret communication system of claim 13, wherein the selective perturbation of the group of data-bearing RF signals is performed in accordance with a message to be transmitted.

15. A method of securely providing information to a target device, comprising:
transmitting, via each of at least two of a plurality of radio frequency (RF) transmitters proximate the target device, a respective data-bearing RF signal, each data bearing RF signal being substantially similar and having common data modulated thereon; and
adapting, at each of said at least two of said plurality of RF transmitters proximate the target device, a phase offset parameter of a respective transmitted data-bearing RF signal such that the at least two data-bearing RF signals arrive at the target device in a substantially phase aligned manner; and
phase-dithering each data-bearing RF signal produced by at least a subset of the at least two RF transmitters to selectively perturb, as a group, the data-bearing RF signals produced by the subset of the at least two RF transmitters, wherein the perturbation is performed in accordance with a message to be transmitted.

16. The method of claim 15, wherein each of said data-bearing RF signals transmitted toward said target device includes common data modulated thereon in accordance with a common encoding scheme.

17. The method of claim 16, wherein each of said data-bearing RF signals transmitted toward said target device is phase perturbed in accordance with a common phase perturbation scheme.

* * * * *